(12) United States Patent
Umemura

(10) Patent No.: US 6,557,837 B2
(45) Date of Patent: May 6, 2003

(54) LIQUID-FILLED CYLINDER-SHAPED HYDRAULIC VIBRATION ISOLATOR

(75) Inventor: Satoshi Umemura, Kamo-gun (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/905,871

(22) Filed: Jul. 17, 2001

(65) Prior Publication Data

US 2002/0014729 A1 Feb. 7, 2002

(30) Foreign Application Priority Data

Jul. 27, 2000 (JP) ........................................ 2000-226475

(51) Int. Cl.⁷ ................................................ F16M 9/00
(52) U.S. Cl. ............................... 267/140.11; 267/141.2
(58) Field of Search ...................... 267/140.11, 140.12, 267/140.13, 140.3, 140.4, 140.5, 141, 141.2, 141.3, 141.4, 141.5, 141.7; 248/562, 636, 638

(56) References Cited

U.S. PATENT DOCUMENTS 5,887,859 A * 3/1999 Hadano et al. .......... 267/141.1

FOREIGN PATENT DOCUMENTS

JP 58-170610 10/1983
JP 10-281211 10/1998

* cited by examiner

*Primary Examiner*—Pam Rodriguez
(74) *Attorney, Agent, or Firm*—Oblon, Spivak, McClelland, Maier & Neustadt, P.C.

(57) ABSTRACT

A liquid-filled cylinder-shaped hydraulic vibration isolator includes a main axial fitting, an intermediate cylinder fitting, a rubber elastic body, an outer cylinder fitting, and a sealing rubber. The intermediate cylinder fitting includes a pair of ring members and a bridging member bridging the ring members. The respective ring members include a drawn major-diameter portion, positioned on an outside in the axial direction and subjected to drawing, and a minor-diameter portion disposed inside the drawn major-diameter portion by way of a stepped portion, formed as a smaller diameter than that of the drawn major-diameter portion and having a plurality of slits formed along the peripheral direction. The sealing rubber is fastened to outer peripheral surfaces of the minor-diameter portion and the bridging member so as to enclose window portions, formed in the intermediate cylinder fitting. Thus, as one of the advantages, the durability of the rubber elastic body can be improved.

3 Claims, 6 Drawing Sheets

LIQUID-FILLED CYLINDER-SHAPED HYDRAULIC VIBRATION ISOLATOR

BACKGROUND OF THE INVENTION

1. Field of the Invention

The present invention relates to a liquid-filled cylinder-shaped hydraulic vibration isolator, which can be suitably employed as a suspension bushing, an engine mount, a cab mount, and so on, of an automobile, for example.

2. Description of the Related Art

Conventionally, in a suspension mechanism of an automobile, a liquid-filled cylinder-shaped hydraulic vibration isolator has been known which is employed as a suspension bushing for connecting an automobile body with a suspension arm in a vibration-isolating manner. As illustrated in FIGS. 6 or 7, the conventional liquid-filled cylinder-shaped hydraulic vibration isolator comprises a main axial fitting 101, a stopper 102, an intermediate cylinder fitting 103, a rubber elastic body 104, an outer cylinder fitting 105, and a cylinder-shaped sealing rubber 106. The stopper 102 is fixed to an outer periphery of the central portion of the main axial fitting 101. The intermediate cylinder fitting 103 is disposed outside the main axial fitting 101 coaxially, and includes a pair of ring members 131, 131, which are disposed on the opposite ends thereof in the axial direction thereof and two bridging members 132, 132, which bridge between both of the ring members 131, 131 to form two window portions 133, 133, which are disposed in the peripheral direction thereof, together with both of the ring members 131, 131. The rubber elastic body 104 is interposed between the main axial fitting 101 and the intermediate fitting 103 to connect them integrally, and has two dented portions 144, 145, which are opened to the window portions 133, 133 of the intermediate cylinder fitting 103. The outer cylinder fitting 105 is disposed outside the intermediate cylinder fitting 103 coaxially, covers the openings of the dented portions 144, 145 by being subjected to drawing, and forms a main liquid chamber 151 and an auxiliary chamber 152, which are filled with a liquid "L" and which are communicated with each other by way of an orifice passage 153, between itself and the dented portions 144, 145. The sealing rubber 106 is fastened to an inner peripheral surface of the outer cylinder fitting 105 to seal the liquid "L", which is filled in the main liquid chamber 151 and the auxiliary liquid chamber 152.

Note that, in this conventional liquid-filled cylinder-shaped hydraulic vibration isolator, while the main liquid chamber 151 and the auxiliary liquid chamber 152 are immersed in the liquid "L" to be filled therein, the outer cylinder fitting 105, which is disposed outside the intermediate cylinder fitting 103 coaxially, is reduced diametrically by subjecting it to drawing so that the openings of the respective dented portions 144, 145 of the rubber elastic body 104 are covered in a liquid-proof manner. Thus, the liquid "L" is filled in the main liquid chamber 151 and the auxiliary liquid chamber 152.

This conventional liquid-filled cylinder-shaped hydraulic vibration isolator is connected and fixed to an installation portion of either one of the automobile body and the suspension arm, which are to be connected, with the main axial fitting 101 by way of a bolt, etc., and is connected and fixed to an installation portion of the other one thereof by fitting the outer cylinder fitting 105 thereinto by means of pressing, and so on. Thus, the conventional liquid-filled cylinder-shaped hydraulic vibration isolator is disposed so that the main liquid chamber 151 and the auxiliary liquid chamber 152 are positioned along input directions of main vibrations, which are input into the conventional liquid-filled cylinder-shaped hydraulic vibration isolator. When the vibrations are input between the main axial fitting 101 and the outer cylinder fitting 105 in axially perpendicular directions with respect to the thus disposed conventional liquid-filled cylinder-shaped hydraulic vibration isolator, the vibrations can be attenuated effectively by the elastic action of the rubber elastic body 104 and the liquid-pillar resonance action of the liquid "L" which flows by way of the orifice passage 153 between the main liquid chamber 151 and the auxiliary liquid chamber 152.

By the way, when this conventional liquid-filled cylinder-shaped hydraulic vibration isolator is disposed in an automobile, a load of an automobile body is applied to it as an initial load in the axially perpendicular directions. Along with the application of the initial load, there occurs a tensile strain concentratedly in a part of the rubber elastic body 104. When the tensile strain thus occurs in the rubber elastic body 104, the rubber elastic body 104 starts deteriorating at the portion to lessen the strength so that the durability of the liquid-filled cylinder-shaped hydraulic vibrator degrades. Hence, the following operations are carried out generally in order to improve the durability. For instance, after forming the rubber elastic body 104 by vulcanization molding integrally between the main axial fitting 101 and the intermediate cylinder fitting 103, the rubber elastic body 104 is compressed preliminarily by subjecting an outer peripheral surface of the intermediate cylinder fitting 103 to drawing so as to relieve the tensile strain, which takes place accompanied by the application of the initial load.

In addition, in the conventional liquid-filled cylinder-shaped hydraulic vibration isolator, the sealing rubber 106, which is fastened to an inner peripheral surface of the outer cylinder fitting 105, is disposed in order to inhibit the liquid "L", which is filled in the main liquid chamber 151 and the auxiliary chamber 152, from leaking. However, the sealing rubber 106 is formed independently of the rubber elastic body 104. Accordingly, since an additional and independent process is required for forming this sealing rubber 106 by vulcanization molding, it is one of the causes, which result in increasing the manufacturing cost.

On the other hand, it is possible to think of forming the sealing rubber 106 integrally with the rubber elastic body 104 so as to fasten it to an outer peripheral surface of the intermediate cylinder fitting 103. However, if such is the case, when the preliminary load is applied to the rubber elastic body 104 by subjecting the outer peripheral surface of the intermediate cylinder fitting 103 to drawing as set forth above, the sealing rubber 106 might be damaged by a drawing jig so that there might arise a fear in that it does not fulfil the sealing function, because the drawing is carried out to the intermediate cylinder fitting 103 by way of the sealing rubber 106.

SUMMARY OF THE INVENTION

The present invention has been developed in view of the aforementioned circumstances. It is therefore an object of the present invention to provide a liquid-filled cylinder-shaped hydraulic vibration isolator, whose manufacturing cost is reduced by disposing a sealing rubber onto an intermediate cylinder fitting and in which the intermediate cylinder fitting is subjected to even drawing without damaging the sealing rubber.

In an aspect of the present invention, a liquid-filled cylinder-shaped hydraulic vibration isolator, which can carry out the aforementioned object, comprises: a main axial fitting; an intermediate cylinder fitting disposed outside the main axial fitting coaxially and including a pair of ring members positioned on the opposite ends thereof in the axial direction thereof and a bridging member bridging between both of the ring members to form a plurality of window portions, disposed in the peripheral direction thereof, together with both of the ring members; a rubber elastic body interposed between the main axial fitting and the intermediate cylinder fitting to connect them integrally and having a plurality of dented portions, opened to the window portions of the intermediate cylinder fitting; an outer cylinder fitting disposed outside the intermediate cylinder fitting coaxially, covering the openings of the dented portions by being subjected to drawing and forming a plurality of liquid chambers, filled with a liquid and communicated with each other by way of an orifice passage, between itself and the dented portions of the rubber elastic body; a sealing rubber disposed between the intermediate cylinder fitting and the outer cylinder fitting to seal the liquid filled in the liquid chambers; the respective ring members of the intermediate cylinder fitting including a drawn major-diameter portion positioned on an outside in the axial direction thereof and being subjected to drawing and a minor-diameter portion disposed inside the drawn major-diameter portion by way of a stepped portion, formed as a smaller diameter than that of the drawn major-diameter portion and having a plurality of slits formed along the peripheral direction thereof; and the sealing rubber being fastened to outer peripheral surfaces of the minor-diameter portion and the bridging member so as to enclose the window portions of the intermediate cylinder fitting.

In the liquid-filled cylinder-shaped hydraulic vibration isolator according to the present invention, when a preliminary load is applied to the rubber elastic body by subjecting an outer peripheral surface of the intermediate cylinder fitting to drawing, the drawing is carried out while a drawing jig is directly brought into contact with the drawn major-diameter portion of the ring members, on which the sealing rubber is not positioned. Hence, the sealing rubber is not damaged by the drawing jig. Further, since the minor-diameter portion of the ring members is provided with a plurality of the slits along the peripheral direction, the minor-diameter portion and the bridging member are reduced diametrically substantially equally to follow the drawing of the drawn major-diameter portion. Therefore, the entire intermediate cylinder fitting is drawn substantially evenly by subjecting only the major-diameter portion to the drawing. Thus, it is possible to apply the most suitable preliminary load to the rubber elastic body, and accordingly it is possible to improve the durability.

Moreover, in the liquid-filled cylinder-shaped hydraulic vibration isolator according to the present invention, since the sealing rubber is fastened to the outer peripheral surfaces of the minor-diameter portion and the bridging portion, which are reduced diametrically substantially equally to follow the drawing of the drawn major-diameter portion, the crimping allowance (i.e., the portion of the sealing rubber which protrudes radially beyond the outer peripheral surface of the drawn major-diameter portion) of the sealing rubber does not vary before and after the drawing. Hence, it is possible to secure the designed crimping allowance for the sealing rubber with ease. Note that, since the sealing rubber is disposed on the intermediate cylinder fitting, which is connected integrally with the rubber elastic body, it is possible to simultaneously form the sealing rubber in the same manufacturing process as the process for forming the rubber elastic body by vulcanization molding. Thus, it is possible to reduce the manufacturing cost by reducing the man-hour requirement for vulcanization.

Therefore, in accordance with the present liquid-filled cylinder-shaped hydraulic vibration isolator, it is possible to reduce the manufacturing cost by disposing the sealing rubber on the intermediate cylinder fitting. Further, it is possible to subject the intermediate cylinder fitting to even drawing without damaging the sealing rubber.

In a further aspect of the present invention, the present liquid-filled cylinder-shaped hydraulic vibration isolator employs the slits, which are disposed at equal intervals in the peripheral direction of the minor-diameter portion.

With such an arrangement, when an outer peripheral surface of the drawn major-diameter portion of the intermediate cylinder fitting is subjected to drawing, it is possible to diametrically reduce the minor-diameter portion, which is reduced diametrically to follow the drawing of the drawn major-diameter portion, much more equally. Thus, it is possible to realize much more even drawing for the intermediate cylinder fitting.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purposes of illustration only and not intended to limit the scope of the appended claims.

An example of the present invention will be hereinafter described with reference to the drawings.

Figure 1:
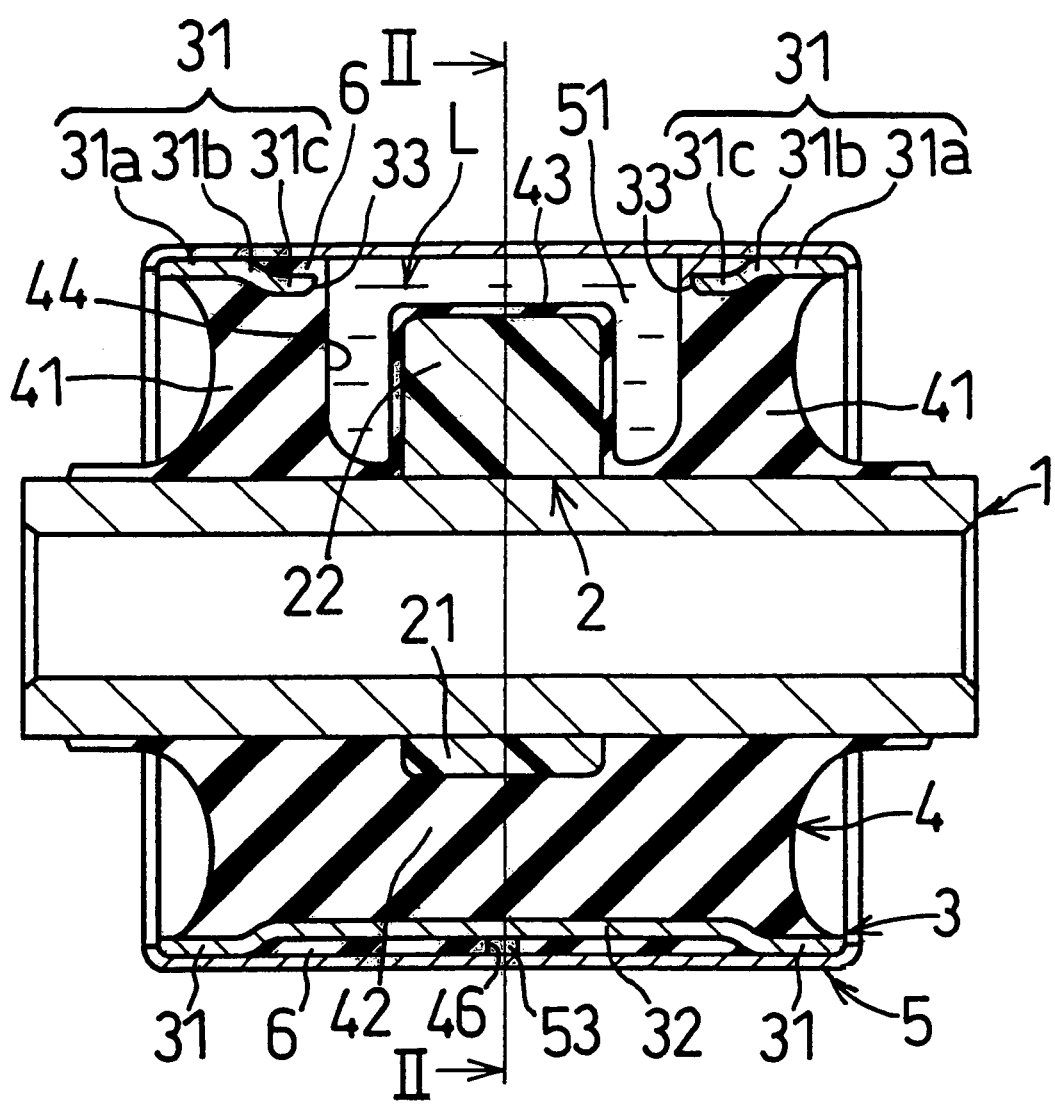
FIG. 1 is a cross sectional view of an example according to a liquid-filled cylinder-shaped hydraulic vibration isolator of the present invention, cross sectional view which is taken along the axial direction thereof and which is viewed in the direction of the arrows I—I of FIG. 2.
Figure 2:
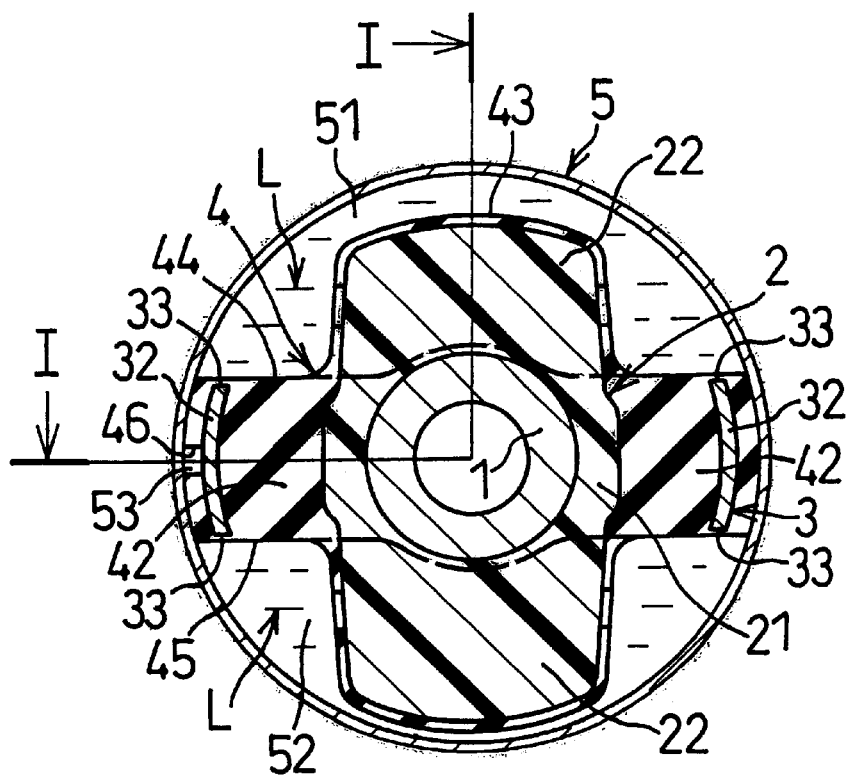
FIG. 2 is a cross sectional view of the example according to a liquid-filled cylinder-shaped hydraulic vibration isolator of the present invention, cross sectional view which is taken along the axially perpendicular direction thereof and which is viewed in the direction of the arrows II—II of FIG. 1.
Figure 3:
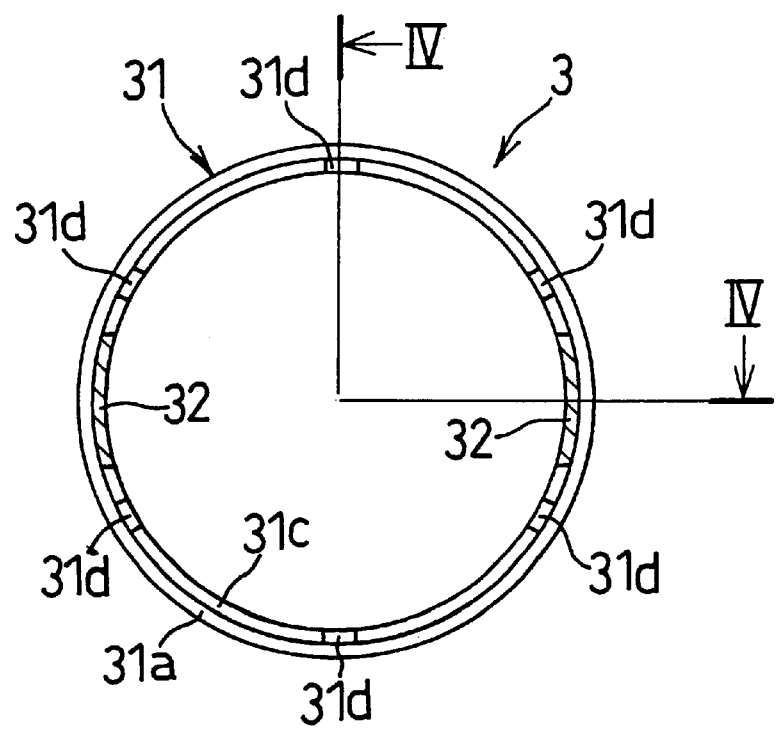
FIG. 3 is a cross sectional view of an intermediate cylinder fitting in the example according to a liquid-filled cylinder-shaped hydraulic vibration isolator of the present invention, cross sectional view which is taken along the axially perpendicular direction thereof and which is viewed in the direction of the arrows III—III of FIG. 4.
Figure 4:
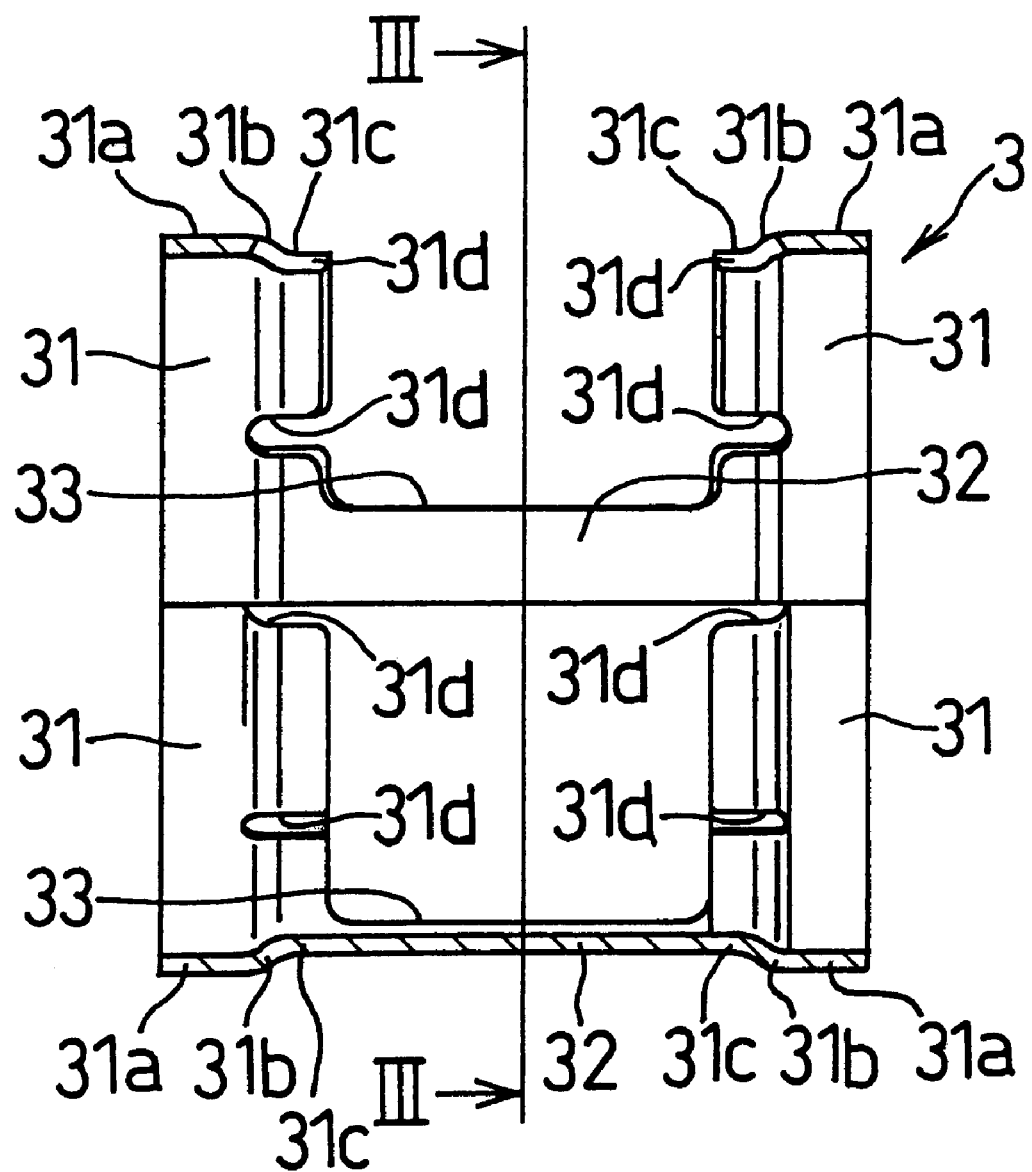
FIG. 4 is a cross sectional view of the intermediate cylinder fitting in the example according to a liquid-filled cylinder-shaped hydraulic vibration isolator of the present invention, cross sectional view which is taken along the axial direction thereof and which is viewed in the direction of the arrows IV—IV of FIG. 3.

FIG. 1 is a cross sectional view of an example according to a liquid-filled cylinder-shaped hydraulic vibration isolator of the present invention, cross sectional view which is taken along the axial direction thereof and which is viewed in the direction of the arrows I—I of FIG. 2. FIG. 2 is a cross sectional view of the example according to the present liquid-filled cylinder-shaped hydraulic vibration isolator, cross sectional view which is taken along the axially perpendicular direction thereof and which is viewed in the direction of the arrows II—II of FIG. 1. FIG. 3 is a cross sectional view of an intermediate cylinder fitting in the example according to the present liquid-filled cylinder-shaped hydraulic vibration isolator, cross sectional view which is taken along the axially perpendicular direction thereof and which is viewed in the direction of the arrows III—III of FIG. 4. FIG. 4 is a cross sectional view of the intermediate cylinder fitting in the example according to the present liquid-filled cylinder-shaped hydraulic vibration isolator, cross sectional view which is taken along the axial direction thereof and which is viewed in the direction of the arrows IV—IV of FIG. 3.

As illustrated in FIG. 1 and FIG. 2, the example according to the present liquid-filled cylinder-shaped hydraulic vibration isolator comprises a main axial fitting 1, a stopper 2, an intermediate cylinder fitting 3, a rubber elastic body 4, an outer cylinder fitting 5, and a sealing rubber 6 as the main constituent elements. The stopper 2 is fixed to the outer periphery of the main fitting 1 at the central portion thereof. The intermediate cylinder fitting 3 is disposed outside the main axial fitting 1 coaxially and includes a pair of ring members 31, 31, which are positioned on the opposite ends thereof in the axial direction thereof and which have drawn major-diameter portions 31a, 31a and minor-diameter portions 31c and 31c, and two bridging members 32, 32, which bridge between both of the ring members 31, 31. The rubber elastic body 4 is interposed between the main axial fitting 1 and the intermediate cylinder fitting 3 to connect them integrally, and has two dented portions 44, 45, which are opened in an outer peripheral surface of the rubber elastic body 4. The outer cylinder fitting 5 is disposed outside the intermediate cylinder fitting 3 coaxially, covers the openings of the dented portions 44, 45, and forms a main liquid chamber 51 and an auxiliary liquid chamber 52, in which a liquid is filled and which are communicated with each other by way of an orifice passage 53, between itself and the dented portions 44, 45 of the rubber elastic body 4. The sealing rubber 6 is fastened to outer peripheral surfaces of the minor-diameter portions 31c, 31c and bridging members 32, 32 of the intermediate cylinder fitting 3.

The main axial fitting 1 is made of a metal, and is formed as a cylindrical shape with a substantially constant diameter and a substantially constant thickness.

As illustrated in FIG. 2, the stopper 2 includes an annular base portion 21 and a pair of stopper portions 22, 22. The stopper portions 22, 22 are disposed on symmetric positions with respect to the axis of the base 21, and their leading ends protrude in the centrifugal directions. The stopper 2 is made integrally of a resin. This stopper 2 is formed integrally with the main axial fitting 1 by molding the resin on an outer peripheral surface of the main axial fitting 1 at the central portion thereof.

As illustrated in FIG. 3 and FIG. 4, the intermediate cylinder fitting 3 is made of a thin metal plate, and is formed as a substantially cylindrical shape. As shown in FIG. 4, this intermediate cylinder fitting 3 includes a pair of the ring members 31, 31 and the two bridging members 32, 32. A pair of the ring members 31, 31 are positioned at the opposite ends of the intermediate cylinder fitting 3 in the axial direction thereof. The bridging members 32, 32 extend in the axial direction of the intermediate cylinder fitting 3, and bridge between both of the ring members 31, 31. Between both of the bridging members 32, 32, there are formed two window portions 33, 33, which are demarcated by the bridging members 32, 32 together with both of the ring members 31, 31 and which are arranged in the peripheral direction of the intermediate cylinder fitting 3.

The respective ring members 31, 31 are constituted by drawn major-diameter portions 31a, 31a and minor diameter portions 31c, 31c. The drawn major-diameter portions 31a, 31a are positioned on an outside of the intermediate cylinder fitting 3 in the axial direction thereof, and are to be subjected to drawing. The minor-diameter portions 31c, 31c are positioned inside the drawn major-diameter portions 31a, 31a by way of stepped portions 31b, 31b, and are formed as a smaller diameter than that of the drawn major-diameter portions 31a, 31a. In the respective minor-diameter portions 31c, 31c, there are formed six slits 31d's at equal angular intervals by 60 deg. along the peripheral direction of the intermediate cylinder fitting 3. These slits 31d's are disposed at positions apart from the respective bridging portions 32, 32. Note that the respective bridging members 32, 32 are connected with the respective minor-diameter members 31c, 31c at the opposite ends, and that they are positioned on extension planes, which connect both of the minor-diameter portions 31c, 31c in the axial direction of the intermediate cylinder fitting 3.

The rubber elastic body 4 is formed as a substantially cylindrical shape together with the main fitting 1, the stopper 2 and the intermediate cylinder fitting 3 by carrying out vulcanization molding, and connects the main fitting 1, the stopper 2 and the intermediate cylinder fitting 3 integrally. As illustrated in FIG. 1, this rubber elastic body 4 includes a pair of annular side wall portions 41, 41, a pair of arm-shaped partition wall portions 42, 42, and covering portions 43, 43. The annular side wall portions 41, 41 are disposed on the opposite ends of the rubber elastic body 4 in the axial direction thereof so as to correspond with both of the ring members 31, 31 of the intermediate cylinder fitting 3. The arm-shaped partition wall portions 42, 42 are disposed so as to correspond with both of the bridging members 32, 32 of the intermediate cylinder fitting 3 and divide between both of the annular side wall portions 41, 41 in half. The covering portions 43, 43 cover the outer peripheral surfaces of both of the stopper portions 22, 22. Thus, on both of the diameter-wise opposite sides, which are disposed between both of the annular side walls 41, 41 and which hold the main cylinder fitting 1 therebetween, there are formed dented portions 44, 45 which open to the respective window portions 33, 33 of the intermediate cylinder fitting 3. Both of these dented portions 44, 45 are communicated with each other by an orifice groove 46, which are engraved in the outer peripheral side of one of the bridging members 32, 32 of the intermediate cylinder fitting 3 along the peripheral direction thereof.

The outer cylinder fitting 5 is made of a metal plate, and is formed as a cylindrical shape. While this outer cylinder fitting 5 is placed coaxially outside the intermediate cylinder fitting 3, it is subjected to drawing, and thereby covers the openings of both of the dented portions 44, 45 as well as the opening of the orifice groove 46 in a liquid-proof manner. Thus, the outer cylinder fitting 5 forms the main liquid chamber 51 and the auxiliary liquid chamber 52, in which the liquid "L" is filled, between itself and the respective dents 44, 45 of the rubber elastic body 4. The main liquid chamber 51 and the auxiliary chamber 52 are communicated with each other by an orifice passage 53, which is formed by covering the outer peripheral-side opening of the orifice groove 46 with the outer cylinder fitting 5.

Note that the liquid "L", which is held in the main liquid chamber 51 and the auxiliary liquid chamber 52, is filled therein in the following manner. While the main axial fitting 1, the intermediate cylinder fitting 3, the elastic rubber body 4 and the outer cylinder fitting 5 are immersed in the liquid "L" to be filled in the main liquid chamber 51 and the auxiliary chamber 52, the outer cylinder fitting 5, which is placed coaxially outside the intermediate cylinder fitting 3, is subjected to drawing to cover the openings of the respective dented portions 44, 45 of the rubber elastic body 4 in a liquid-proof manner so that the liquid "L" is sealed in the main liquid chamber 51 and the auxiliary liquid chamber 52. As for the liquid "L", it is possible to use an incompressible liquid, such as water, an alkylene glycol, a silicone oil, and so on, for example.

The sealing rubber 6 is fastened to the outer peripheral surfaces of the minor-diameter portions 31c, 31c and the bridging members 32, 32 so as to enclose the respective window portions 33, 33 of the intermediate cylinder fitting 3. This sealing rubber 6 is formed to have such a height (or thickness) that it protrudes a little bit beyond the outer peripheral surfaces of the major-diameter portions 31a, 31a of the intermediate cylinder fitting 3 in the radial direction thereof. For example, the sealing rubber 6 can preferably protrude beyond the outer peripheral surfaces of the major-diameter portions 31a, 31a of the intermediate cylinder fitting 3 in the radial direction by from 0.4 to 5 mm. Thus, the outer peripheral surface of the sealing rubber 6 is pressed onto the inner peripheral surface of the outer cylinder fitting 5, which is installed outside the intermediate cylinder fitting 3, and thereby the sealing rubber 6 seals the liquid "L", which is filled in the main liquid chamber 51 and the auxiliary liquid chamber 52. Note that this sealing rubber 6 is formed to be integrally connected with the rubber elastic body 4, which advances towards the peripheries of the respective window portions 33, 33 of the intermediate cylinder fitting 3.

Figure 5:
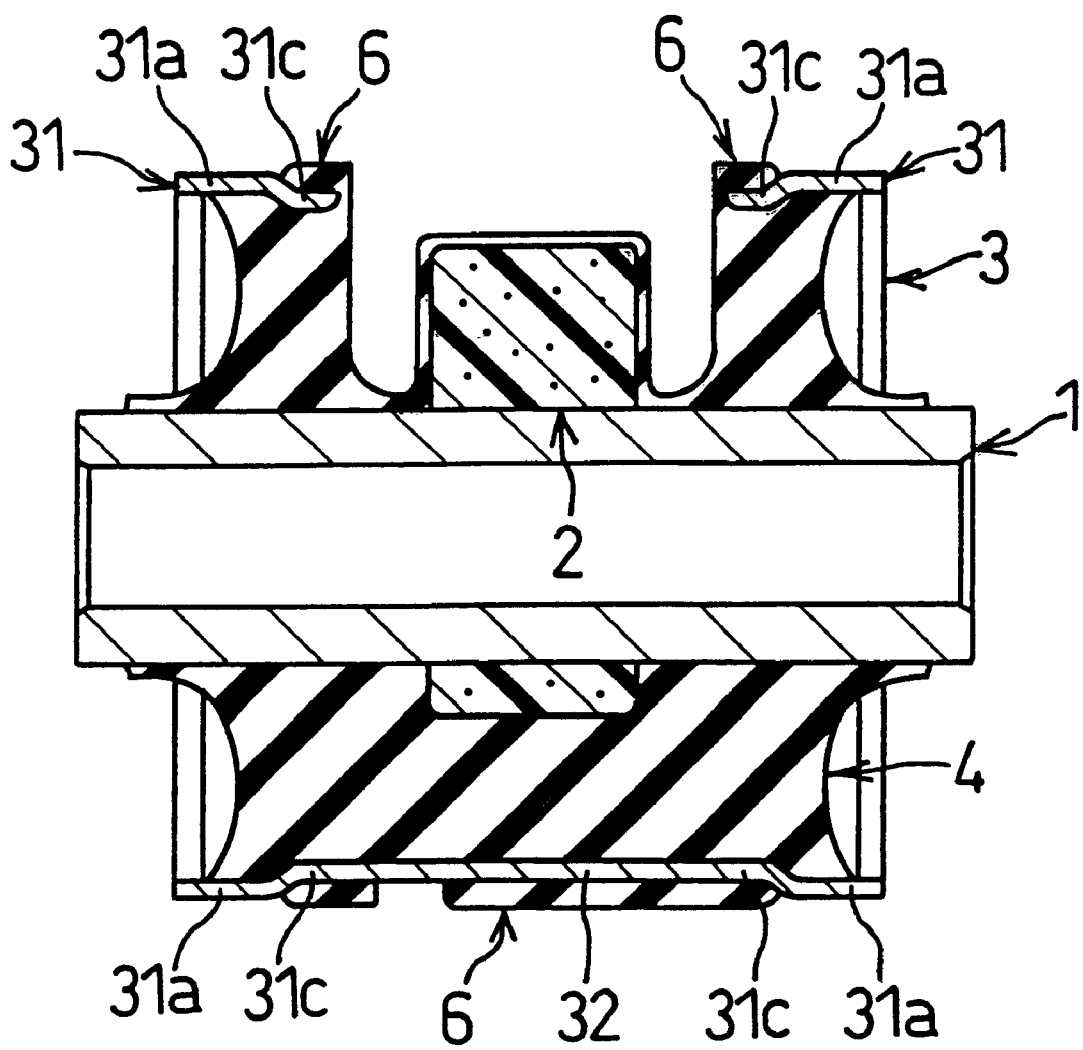
FIG. 5 is a cross sectional view of a vulcanized-rubber molding sub-assembly in the example according to a liquid-filled cylinder-shaped hydraulic vibration isolator of the present invention, cross sectional view which is taken along the axial direction thereof.
Figure 6:
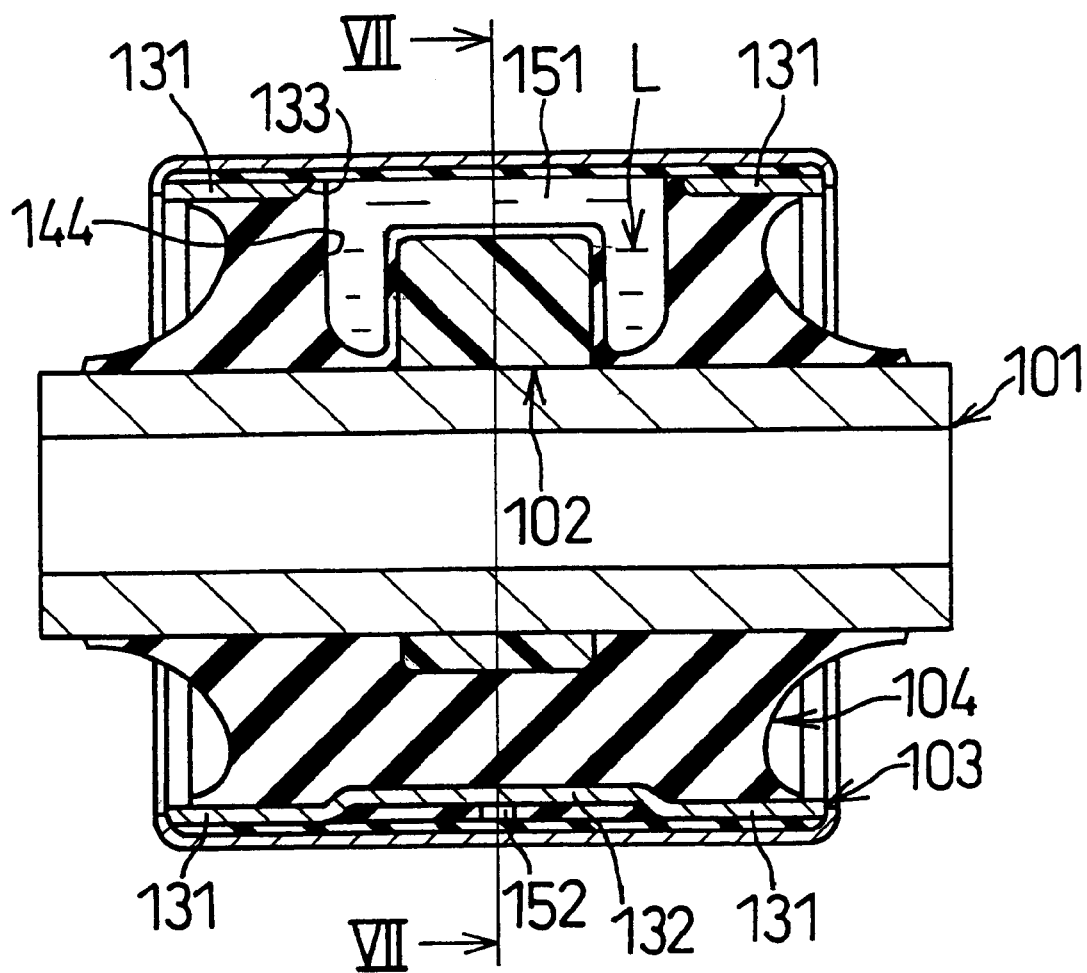
FIG. 6 is a cross sectional view of the conventional liquid-filled cylinder-shaped hydraulic vibration isolator, cross sectional view which is taken along the axial direction thereof and which is viewed in the direction of the arrows VI—VI of FIG. 7.
Figure 7:
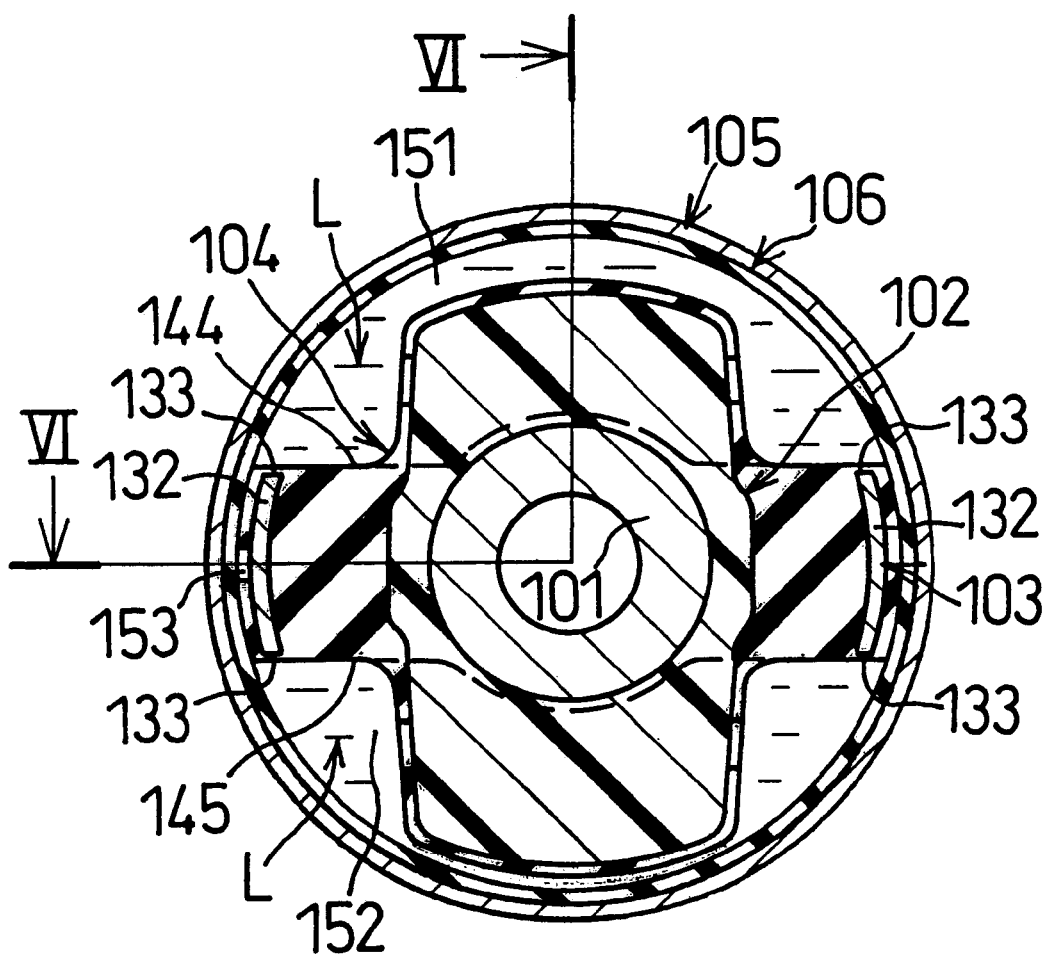
FIG. 7 is a cross sectional view of the conventional liquid-filled cylinder-shaped hydraulic vibration isolator, cross sectional view which is taken along the axially perpendicular direction thereof and which is viewed in the direction of the arrows VII—VII of FIG. 6.

As illustrated in FIG. 5, in the thus constructed example of a liquid-filled cylinder-shaped hydraulic vibration isolator according to the present invention, the sealing rubber 6 is formed integrally with the rubber elastic body 4 so that it is fastened onto the outer peripheral surfaces of the minor-diameter portions 31c, 31c and bridging members 32, 32 of the intermediate cylinder fitting 3 when the rubber elastic body 4 is formed by vulcanization molding integrally between the main axial fitting 1 and the intermediate cylinder fitting 3, which are positioned coaxially. Then, drawing is carried out onto the outer peripheral surfaces of the intermediate cylinder fitting 3 in the resulting vulcanized-rubber molding sub-assembly shown in FIG. 5. Thus, a preliminary load is applied to the rubber elastic body 4.

In this case, since the drawing is carried out while a drawing jig is directly brought into contact with both of the drawn major-diameter portions 31a, 31a of the intermediate cylinder fitting 3 on which the sealing rubber 6 is not placed, the sealing rubber 6 is not damaged by the drawing jig. Further, since the six slits 31d's are formed in both of the minor-diameter portions 31c, 31c of the intermediate cylinder fitting 3 along the peripheral direction thereof, the minor-diameter portions 31c, 31c and bridging members 32, 32 of the intermediate cylinder fitting 3 follow the drawing of the drawn major-diameter portions 31a, 31a so that they are reduced diametrically substantially equally. Hence, the entire intermediate cylinder fitting 3 is drawn substantially evenly by subjecting only the drawn major-diameter portions 31a, 31a to the drawing. Thus, it is possible to apply the most suitable preliminary load to the rubber elastic body 4, and accordingly to improve the durability.

Furthermore, since the sealing rubber 6 is fastened to the outer peripheral surfaces of the minor-diameter portions 31c, 31c and bridging members 32, 32, which are reduced diametrically substantially equally to follow the drawing of the drawn major-diameter portions 31a, 31a, when the intermediate cylinder fitting 3 is subjected to the drawing, the crimping allowance of the sealing rubber 6 (i.e., the portions of the sealing rubber 6, which protrude radially beyond the outer peripheral surfaces of the drawn major-diameter portions 31a, 31a ) does not vary before and after the drawing. Hence, it is possible to secure the designed crimping allowance of the sealing rubber 6 with ease. Note that, since this sealing rubber 6 is formed simultaneously and integrally with the rubber elastic body 4 in the same process as the process for forming the rubber elastic body 4 by vulcanization molding, the manufacturing cost is reduced by reducing the man-hour requirement for vulcanization.

As having described so far, in accordance with the example of the present liquid-filled cylinder-shaped hydraulic vibration isolator, it is possible to reduce the manufacturing cost by placing the sealing rubber 6 on predetermined positions of the intermediate cylinder fitting 3, and at the same time to subject the intermediate cylinder fitting 3 to the even drawing without damaging the sealing rubber 6. Thus, it is possible to upgrade the durability of the rubber elastic body 4 by applying the most suitable preliminary load to the rubber elastic body 4.

In particular, since the slits 31d's are formed at equal intervals in the peripheral direction of the minor-diameter portions 31c, 31c of the intermediate cylinder fitting 3, it is possible to diametrically reduce the minor-diameter portions 31c, 31c much more equally in the peripheral direction when the minor-diameter portions 31c, 31c are reduced diametrically by subjecting the outer peripheral surfaces of the drawn major-diameter portions 31a, 31a to the drawing. Thus, it is possible to realize to much more evenly draw the intermediate cylinder fitting 3.

Note that, in the above-described example, six slits 31d's are formed in the respective minor-diameter portions 31c, 31c. However, taking the strength of the minor-diameter portions 31c, 31c, the extent of the drawing, and so on, into consideration, it is possible to appropriately determine the quantity of the slits 31d's. For example, the slits 31d's can preferably be formed in a quantity of from 4 to 6.

Moreover, in the example, the sealing rubber 6 is connected with and formed integrally with the rubber elastic body 4 simultaneously in the same process as the process for forming the rubber elastic body 4 by vulcanization molding. However, it is possible to form the sealing rubber 4 as an independent and separate component part without connecting it with the rubber elastic body 4.

In addition, in the example, the orifice passage 53, which communicates the main liquid chamber 51 and the auxiliary chamber 52 with each other, is disposed in the outer peripheral portion of the rubber elastic body 4. However, the orifice passage 53 should not necessarily be disposed in the portion. For instance, it is possible to dispose the orifice passage 53 in the main axial fitting 1 or the stopper 2.

Having now fully described the present invention, it will be apparent to one of ordinary skill in the art that many changes and modifications can be made thereto without departing from the spirit or scope of the present invention as set forth herein including the appended claims.

What is claimed is:

1. A liquid-filled cylinder-shaped hydraulic vibration isolator, comprising:

a main axial fitting;

an intermediate cylinder fitting disposed outside said main axial fitting coaxially and including a pair of ring members positioned on the opposite ends thereof in the axial direction thereof and a bridging member bridging between both of the ring members to form a plurality of window portions, disposed in the peripheral direction thereof, together with both of the ring members;

a rubber elastic body interposed between said main axial fitting and said intermediate cylinder fitting to connect them integrally and having a plurality of dented portions, opened to the window portions of said intermediate cylinder fitting;

an outer cylinder fitting disposed outside said intermediate cylinder fitting coaxially, covering the openings of the dented portions by being subjected to drawing and forming a plurality of liquid chambers, filled with a liquid and communicated with each other by way of an orifice passage, between itself and the dented portions of said rubber elastic body;

a sealing rubber disposed between said intermediate cylinder fitting and said outer cylinder fitting to seal the liquid filled in the liquid chambers;

the respective ring members of said intermediate cylinder fitting including a drawn major-diameter portion positioned on an outside in the axial direction thereof and being subjected to drawing and a minor-diameter portion disposed inside the drawn major-diameter portion by way of a stepped portion, formed as a smaller diameter than that of the drawn major-diameter portion and having a plurality of slits formed along the peripheral direction thereof;

said sealing rubber being fastened to outer peripheral surfaces of the minor-diameter portion and the bridging member so as to enclose the window portions of said intermediate cylinder fitting; and wherein the slits are disposed at about equal intervals in the peripheral direction of the minor-diameter portion of the respective ring members of said intermediate cylinder fitting.

2. The liquid-filled cylinder-shaped hydraulic vibration isolator according to claim 1, wherein said sealing rubber is formed integrally with said rubber elastic body.

3. The liquid-filled cylinder-shaped hydraulic vibration isolator according to claim 1, where said sealing rubber is formed to have such a height that it protrudes beyond the outer peripheral surfaces of the major-diameter portions of the intermediate cylinder fitting in the radial direction thereof.

* * * * *